United States Patent
Grupa et al.

(10) Patent No.: US 10,530,137 B2
(45) Date of Patent: Jan. 7, 2020

(54) COAXIAL MOTOR POWER CABLE

(71) Applicant: BAE Systems Land & Armaments L.P., Arlington, VA (US)

(72) Inventors: Timothy Grupa, Golden Valley, MN (US); Melvin Gjertvig, St. Francis, MN (US)

(73) Assignee: BAE Systems Land & Armaments L.P., Arlington, VA (US)

( * ) Notice: Subject to any disclaimer, the term of this patent is extended or adjusted under 35 U.S.C. 154(b) by 0 days.

(21) Appl. No.: 15/401,692

(22) Filed: Jan. 9, 2017

(65) Prior Publication Data

US 2017/0200531 A1 Jul. 13, 2017

Related U.S. Application Data

(60) Provisional application No. 62/276,001, filed on Jan. 7, 2016.

(51) Int. Cl.
| | |
|---|---|
| *H01B 11/06* | (2006.01) |
| *H02G 3/04* | (2006.01) |
| *H01B 9/02* | (2006.01) |

(52) U.S. Cl.
CPC .......... *H02G 3/0462* (2013.01); *H01B 9/029* (2013.01)

(58) Field of Classification Search
CPC ............ H01B 9/00; H01B 11/04; H01B 11/06
USPC .......................................... 174/113 R, 105 R
See application file for complete search history.

(56) References Cited

U.S. PATENT DOCUMENTS

| | | | |
|---|---|---|---|
| 2,203,806 A | 6/1940 | Wolf | |
| 2,437,482 A | 3/1948 | Salisbury | |
| 2,589,328 A | 3/1952 | Bondon | |
| 2,752,577 A | 6/1956 | Polk | |
| 3,701,086 A * | 10/1972 | Somerset | H01R 24/562 |
| | | | 174/75 C |
| 4,507,631 A | 3/1985 | Louet et al. | |
| 4,866,842 A * | 9/1989 | Gorjat | H01B 7/24 |
| | | | 29/857 |
| 5,481,069 A * | 1/1996 | Andresen | H01B 7/0853 |
| | | | 174/117 F |
| 6,169,251 B1 * | 1/2001 | Grant | H01B 11/005 |
| | | | 174/113 C |
| 7,241,951 B2 * | 7/2007 | Donazzi | H01B 9/02 |
| | | | 174/36 |

(Continued)

FOREIGN PATENT DOCUMENTS

FR 2644282 A1 9/1990

*Primary Examiner* — Chau N Nguyen
(74) *Attorney, Agent, or Firm* — Patterson Thuente Pedersen, P.A.

(57) ABSTRACT

A coaxial three-phase servo motor power cable is comprised of a shielded twisted triple cable which transmits three phase electrical power from a servo amplifier to a servo motor, with the shield being electrically insulated and mechanically floating within an air void that exists inside a conduit having a diameter much greater than the shielded twisted triple cable. The conduit is covered by a braid shield, which is covered by shrink tubing which may be overlaid by one or more additional signal wires, with this entire assembly being further covered by an over braid shield, which is covered by an outer insulating sheath. Both the conduit braid shield and over braid shield are electrically terminated to back shells at each end of a cable assembly.

18 Claims, 5 Drawing Sheets

(56) References Cited

U.S. PATENT DOCUMENTS 7,692,099 B2 * 4/2010 Burke ...................... H01B 7/06
174/113 C

* cited by examiner

COAXIAL MOTOR POWER CABLE

RELATED APPLICATION

The present application claims the benefit of U.S. Provisional Application No. 62/276,001 entitled "COAXIAL MOTOR POWER CABLE", filed Jan. 7, 2016, which is incorporated herein by reference in its entirety.

FIELD OF THE INVENTION

The present invention relates to electrical cables. More particularly, the present invention relates to a coaxial three-phase servo motor power cable.

BACKGROUND OF THE INVENTION

Servo motors are used in a wide range of industrial and military applications to position equipment rapidly and with a high degree of positional accuracy. Examples of these uses include industrial robots which are used in manufacturing operations, and military vehicle artillery units. Servo electronic equipment is generally comprised of a three-phase servo amplifier and a three-phase servo motor that are electrically connected by a three-phase servo motor power cable, along with the associated control system.

Conventional three-phase servo motor power cable designs exhibit high values of parasitic electrical capacitance between the power conductors and the shield/ground of the cable. This parasitic conductor to shield/ground capacitance forces the designer to utilize electromagnetic interference (EMI) control techniques that severely impact other important equipment parameters including size, weight, power, and cooling requirements. Servo system design constraints are particularly stringent in a military environment, such as onboard a ship or field artillery vehicle, where stringent military standards for design and performance specifications must be met.

Existing three-phase servo motor power cables of the prior art do not meet the stringent design criteria that exist for some modern servo electronic equipment configurations. For example, a typical cable design of the prior art utilizes three motor conductors with three ground wires which are in close proximity to the three power conductors. The six conductors are covered with an overall shield and insulating jacket. The close proximity of the power conductors to the ground wires and the shield result in a large parasitic conductor to shield/ground capacitance, thereby not complying with the system design criteria specified above.

In an effort to reduce the detrimental effects of parasitic conductor to shield/ground capacitance, designers of servo electronic equipment have devised a solution of inserting common mode inductors in the motor power circuit. While this technique reduces the current flowing in the parasitic capacitance by creating a radio frequency (RF) tuned circuit, it does not reduce the actual parasitic conductor to shield/ground capacitance. This technique has limited effectiveness, and it is typically limited to applications where the circuit can be tuned for a particular installation. Also, because the inductors are large, the added space, weight, and power dissipation requirements are not tolerable in a military application.

The value of parasitic conductor to shield/ground capacitance in a particular cable design is dependent on the dielectric material that is used in the cable. Air as a dielectric has a relative permittivity ($\varepsilon_r$) of 1.0. In comparison, the relative permittivity of the dielectric material used as electrical insulation in conventional cables is 2.0 or higher. Because electrical capacitance is directly proportional to the relative permittivity of the dielectric, the parasitic conductor to shield/ground capacitance of a power cable can be reduced by using air as a dielectric. For example, Polk, U.S. Pat. No. 2,752,577, disclosed a coaxial cable for use in the transmission of radio frequency (RF) power that uses air or another gas as a dielectric material. Unlike the coaxial three-phase servo motor power cable of the present invention, Polk disclosed a single inner electrical conductor, and the single inner conductor was supported by dielectric beads. Therefore, Polk is not useful in a three phase servo motor power cable design.

The high values of parasitic conductor to shield/ground capacitance seen in coaxial three-phase servo motor power cables of the prior art results in a corresponding parasitic electrical current flow, directly contributing to the several issues previously discussed. The additional detrimental effects of this parasitic current flow includes saturation of the circuitry's ground fault detector current transducer, rendering it useless; interfering with sensitive circuits such as the motor resolver and motor RTD; and producing an electrical shock hazard to personnel from induced voltages.

Therefore, there is a current need by servo electronic equipment designers for a three-phase servo motor power cable that meets servo motor power and performance requirements by significantly reducing parasitic conductor to shield/ground capacitance values, while also meeting strict design requirements for electromagnetic interference, radiated and conducted emissions, and personnel electrical safety. Accordingly, satisfying the need for this three-phase servo motor power cable will enable servo electronic equipment designers to utilize servo motor systems that are smaller, lighter in weight, dissipate less power, and therefore require less cooling than existing system designs while also meeting the strict design requirements.

SUMMARY OF THE INVENTION

The coaxial three-phase servo motor power cable of the present invention transmits three phase power from a servo amplifier to a servo motor while significantly reducing the parasitic conductor to shield/ground capacitance over that of the prior art, thereby reducing parasitic electrical current flow, thereby enabling the servo electronic equipment designer to meet stringent system performance requirements by overcoming the several problems that are associated with coaxial three-phase servo motor power cables of the prior art. This invention will enable the design and development of servo electronic equipment that is smaller, lighter in weight, dissipates less power, and therefore require less cooling than existing system designs while also meeting stringent EMI and safety design criteria.

The present invention utilizes a shielded twisted triple cable for three-phase electrical power transmission, a flexible electrically nonconductive conduit constructed from polytetrafluoroethylene (PFA, which is commercially marketed as TEFLON®), a shielded braid, one or more additional motor sensor wires, EMI/Environmental connectors and back shells, and an insulating jacket. The shielded twisted triple cable delivers three-phase electrical power to the servo motor, which is an essential requirement of any three-phase servo motor power cable. Also, as with most three-phase servo motor power cables, the innermost shield is in close proximity to the twisted electrical power conductors. However, unlike the prior art where the innermost shield is electrically connected to the connector back shells, the innermost shield of the present invention is not electrically connected to the back shells. This significantly reduces parasitic conductor to shield/ground capacitance. Because the inner shield is in close proximity to the twisted electrical power conductors, it capacitively couples the three conductors in the twisted triple. This coupling balances the parasitic conductor to shield/ground capacitance, thereby limiting electrical interference with servo amplifier current sensing circuitry.

The coaxial three-phase servo motor power cable of the present invention does not use a mechanical dialectic separator. Instead, the shielded twisted triple cable is allowed to mechanically float inside the relatively large void of the flexible electrically nonconductive conduit, with the void space being filled by air. This reduces cable cost while not appreciably adding to the value of parasitic capacitance. The flexible electrically nonconductive conduit is covered with a braid shield, and this braid shield is electrically terminated to the connector EMI/environmental connector back shells at both ends. The inside diameter of the conduit is generally two to three times the diameter of the shielded twisted triple cable, thereby assuring that the shielded twisted triple cable is separated from the shielded braid by an air void, with the separation distance being significantly greater than that in a conventional three-phase servo motor power cable of the prior art. Because electrical capacitance is inversely proportional to separation distance between conductors, the parasitic conductor to shield/ground capacitance of the present invention is significantly less than that in a conventional three-phase servo motor power cable of the prior art.

As noted, the void surrounding the shielded twisted triple cable inside of the flexible electrically nonconductive conduit is filled with air instead of a solid material insulator. Because the relative permittivity ($\varepsilon r$) of air is 1.0, as compared to the relative permittivity of the electrically insulating material that is used in conventional cables having a value of 2.0 or greater, and because electrical capacitance is directly proportional to the relative permittivity of the dielectric, the parasitic conductor to shield/ground capacitance of the invention is additionally reduced by approximately a factor of two as compared to using a solid insulating dielectric as in a conventional cable.

Finally, the wall thickness of the conduit is relatively thin in comparison to the inside diameter of the conduit. Therefore, the contribution of the electrically nonconductive material the conduit is constructed of (e.g., polytetrafluoroethylene), which has a relative permittivity of approximately 2, makes negligible contribution to the overall parasitic conductor to shield/ground capacitance value.

As with most electrical cable designs, the braid shield of the present invention is electrically connected to the EMI/environmental back shells at both ends. This arrangement forms a Faraday cage which serves the dual purpose of containing radiated emissions and isolating the twisted triple cable from external electromagnetic interference. Finally, the braid shield is covered with an insulating jacket that provides mechanical protection while also helping isolate it from the environment.

The present invention is a coaxial cable for electrical power transmission, comprised of a shielded twisted power cable, the shielded twisted power cable being comprised of a plurality of power conductors that are twisted together and being covered by a braid shield covering the power conductors, the braid shield being electrically insulated from any other electrical component, an electrically insulating sheath covering the shielded twisted power cable, an electrically nonconductive conduit surrounding the electrically insulating sheath, wherein the inside diameter of the electrically nonconductive conduit is greater than the outside diameter of the electrically insulating sheath, the electrically nonconductive conduit defining a void space surrounding the electrically insulating sheath inside of the electrically nonconductive conduit, and a conduit braid shield covering the electrically nonconductive conduit, wherein the conduit braid shield is electrically terminated at each end. The present invention also includes the method of making the coaxial power cable.

An additional advantage of the present invention is that if additional wires need to be routed within the three phase servo motor power cable, they may be placed between the braid shield and the insulating jacket. In a typical servo electronic equipment design, one or more motor sensor wires may be included in the three phase servo motor power cable for proper system operation. If these additional wires are required to be shielded, an additional shielding braid may be placed over these wires inside of the insulating jacket. In a typical embodiment of the present invention where additional wires are routed and an additional shield is used, the additional shield is typically insulated from the shielded braid along the length of the cable.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figures 1A, 1B, 1C:
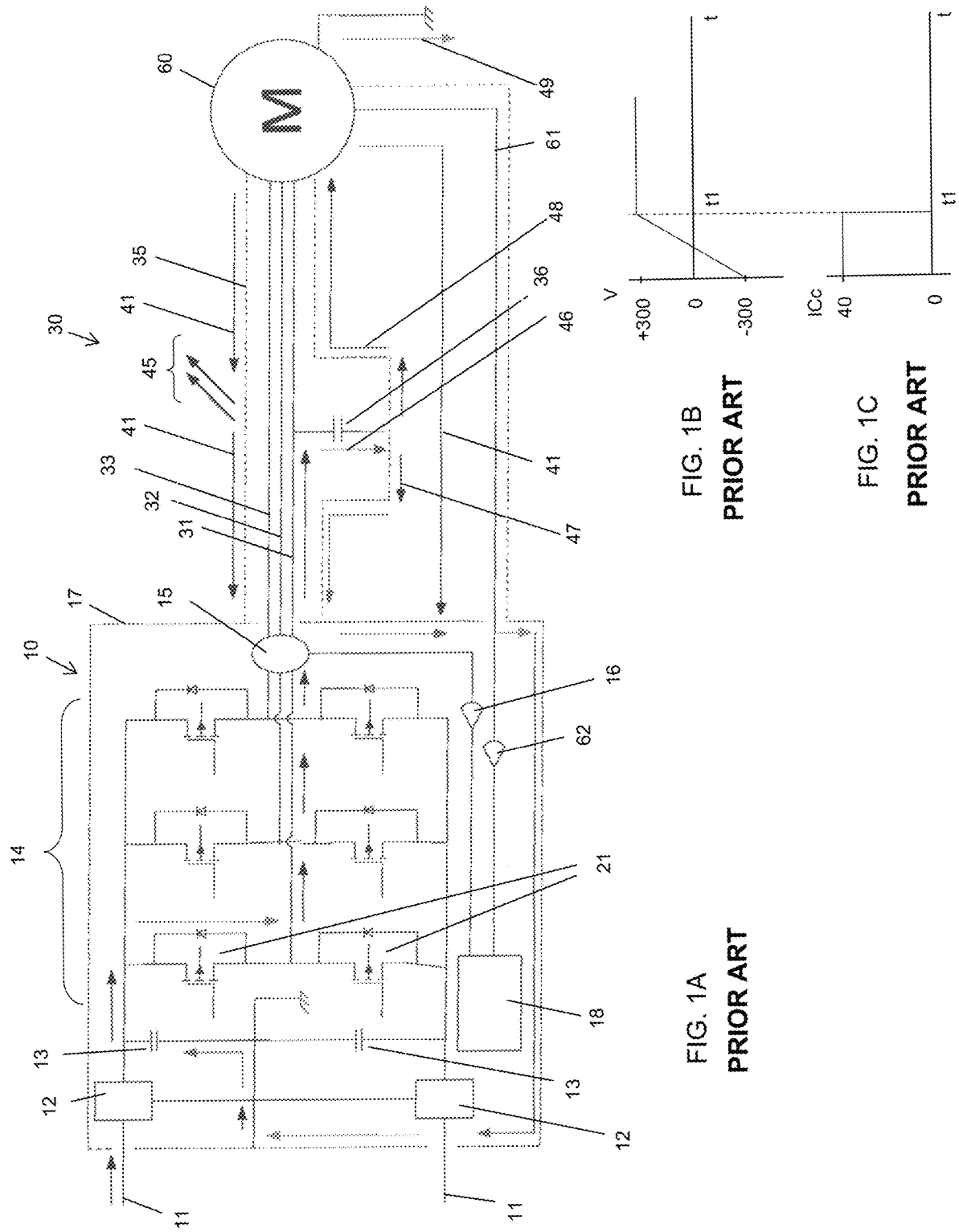
FIG. 1A is an electrical schematic diagram of a typical three-phase servo motor control drive system as seen in the prior art.
FIG. 1B is a typical phase voltage waveform observed during a servo positioning event in the aforementioned three-phase servo control drive system as seen in the prior art.
FIG. 1C is a typical shield current waveform in response to the aforementioned phase voltage waveform observed during a servo positioning event as seen in the prior art.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The present invention is a coaxial three-phase servo motor power cable which may be used in a servo electronic equipment system to supply three-phase differential electrical power from a three-phase servo amplifier to a three-phase servo motor. The present invention may be understood by referring to the figures, beginning with a discussion of the prior art and the problems associated thereof.

FIG. 1A is an electrical schematic diagram of a typical three-phase servo motor control drive system as seen in the prior art. Servo amplifier unit 10 receives electrical power from the ship or vehicle on which it is installed at power supply input 11. EMI filter 12 provides electromagnetic interference (EMI) suppression. Line to chassis common mode filter capacitors 13 also provide EMI interference suppression. Three-phase power inverter circuitry 14 performs three-phase differential voltage generation as commanded by control circuitry 18. Ground fault transducer 15 detects ground fault conditions and provides a ground fault signal 16 into control circuitry 18. Shielded enclosure 17 surrounds servo amplifier unit 10 to provide EMI suppression to the servo electronic equipment, including servo amplifier unit 10. A pair of power semiconductor devices 21 provide complimentary electrical switching to produce a voltage for a single electrical phase of the system.

With a power supply voltage of 600 VDC from power supply input 11, the relative voltage provided to this single phase will vary from −300 VDC to +300 VDC. Three-phase power inverter circuitry 14 is comprised of three pairs of power semiconductor devices 21, thereby producing a three-phase differential voltage signal from servo amplifier unit 10, which is transmitted by three-phase servo motor power cable 30 to power servo motor 60. Three-phase servo motor power cable 30 is comprised of three power wires 31, 32, 33 which correspond to servo motor phases A, B, and C, respectively. Within a servo amplifier schematic diagram, these may also correspond to phases u, v, and w, respectively. Power wires 31, 32, 33 are twisted together and covered by braid shield 41 for EMI suppression. Motor signal cable 61 transmits resolver and RTD information from servo motor 60 back to servo amplifier unit 10, thereby providing resolver and RTD signal 62 into control circuitry 18. The arrangement of the three power wires 31, 32, 33 being contained within braid shield 35 produces a parasitic conductor to shield/ground capacitance which may be modeled as ICc-shield capacitor 36. As a result, parasitic ICc-shield current 46 flows through ICc-shield capacitor 36. ICc-shield current 46 flows in three-phase servo motor power cable 30, resulting in both ICc-shield servo amplifier current 47 and ICc-shield servo motor current 48. A portion of parasitic ICc-shield current 46 may flow on the hull of the ship or structure of the vehicle on which the servo electronic equipment is mounted, thereby potentially interfering with other sensitive circuits, while also inducing a voltage potential which may provide a personnel safety hazard. Being parasitic in nature, ICc-shield servo amplifier current 47 and ICc-shield servo motor current 48 produces detrimental effects in servo amplifier unit 10 and the associated servo electronic equipment systems. Other undesirable effects that occur within the servo electronic equipment system include servo motor power cable interference 41, servo motor power cable shield electromagnetic radiation 45, and servo motor to ground interference 49. Collectively, these adverse effects may render the servo electronic equipment incapable of meeting the stringent design criteria which may exist for a particular application.

FIG. 1B is a typical phase voltage waveform observed during a servo positioning event in the aforementioned three-phase servo control drive system as seen in the prior art. With a power supply voltage of 600 volts from power supply input 11, the voltage transient seen on a particular phase of the circuit may increase from −300 VDC to +300 VDC during a relatively short switching time t1 that is typically 200 nanoseconds. In a typical high performance servo electronic equipment system, switching time t1 may typically range from 100 to 500 nanoseconds.

FIG. 1C is a typical shield current waveform in response to the aforementioned phase voltage waveform observed during a servo positioning event as seen in the prior art. With the voltage swing from −300 VDC to +300 VDC during a switching time t1 of 200 nanoseconds, a typical value of ICc-shield current 46 flowing during this transient is 40 Amps. The value of ICc-shield current 46 is proportional to both the value of ICc-shield capacitor 36 and the time rate of voltage change, dV/dt.

In most applications, including high power applications at which the present invention is directed, it is desirable to have a relatively short switching time t1. Increasing the switching time t1 would help in lowering the value of ICc-shield current 46 flowing during the switching transient, but it would increase the power dissipation in servo amplifier unit 10, thereby increasing the size and weight of the heat sink that is required in servo amplifier unit 10. Therefore, this is not an adequate solution. Accordingly, the high value of ICc-shield current 46 results in a high value of ICc-shield servo amplifier current 47 that flows back through ground fault transducer 15, causing it to electrically saturate and thereby rendering it useless for its intended purpose. Additionally, the resulting high value of ICc-shield servo motor current 48 causes a current flow back along the shield of motor signal cable 61, thereby interfering with low level signals being transmitted such as the resolver and RTD signal 62, which is input back to control circuitry 18, thereby degrading servo electronic equipment system performance. A portion of ICc-shield current 46 may flow back on the ship or vehicle structure, interfering with other sensitive electrical circuits while also inducing a potential voltage which may pose a shock hazard to personnel. Moreover, current flowing back on braid shield 35 induces electromagnetic radiation 45, which propagates into the environment surrounding the servo electronic equipment. Finally, the calculated value of ICc-shield capacitor 36 drives the value required for line to chassis common mode filter capacitors 13, with an increasing value increasing the hazards of electrical shock to personnel.

Figure 2:
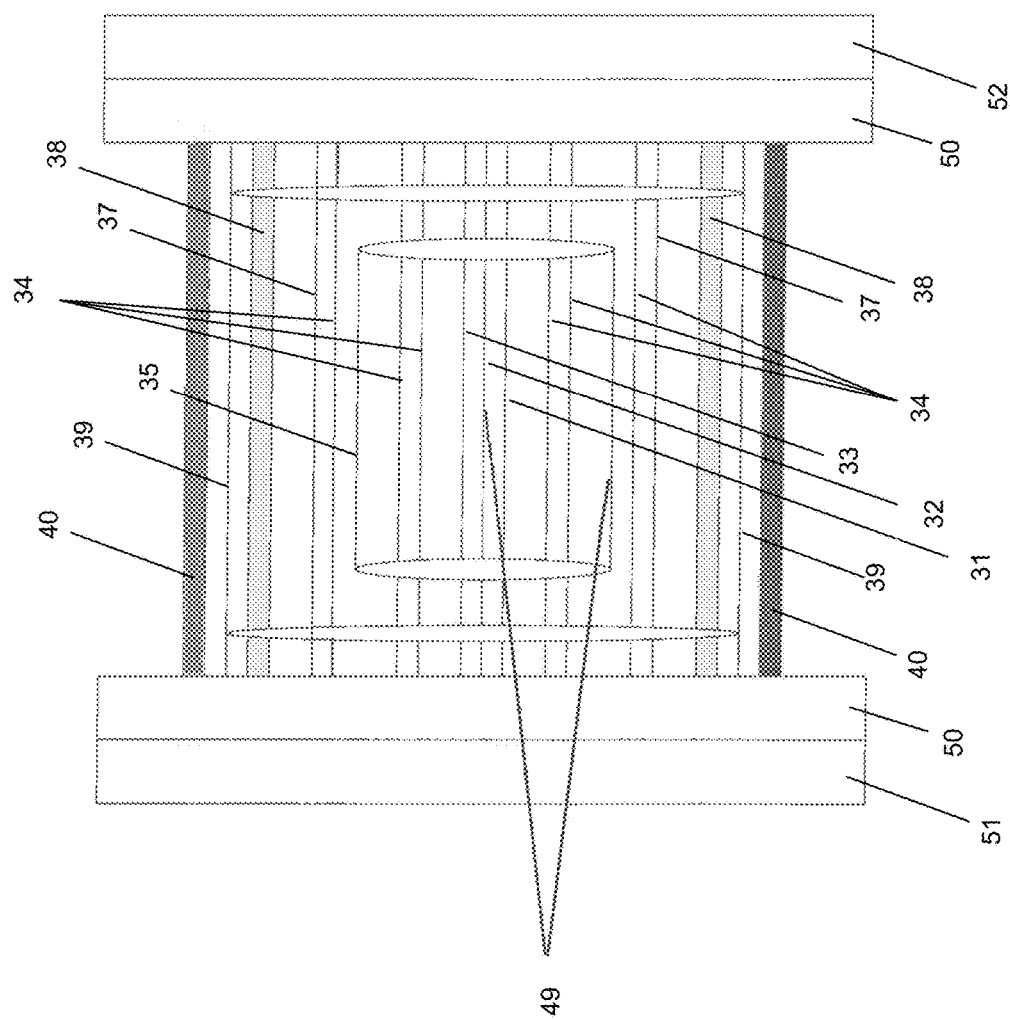
FIG. 2 is a cross-sectional diagram of a typical coaxial three-phase servo motor power as seen in the prior art.

FIG. 2 is a cross-sectional diagram of a typical coaxial three-phase servo motor power cable of the prior art as disclosed in FIG. 1A. Three power wires 31, 32, 33 correspond to servo motor phase terminals A, B, and C, respectively. Power wires 31, 32, 33 are twisted together and covered by two layers of insulating tape 34, which is then covered by shield braid 35. A pair of additional signal wires 37 are used to transmit motor signals and other information. This assembly is surrounded by insulating conduit 38, which is covered by copper over braid 39, which is finally covered by outer sheathing 40. Each end of the cable assembly includes an EMI and environmental back shell 50. One end of the cable assembly is terminated with connector plug 51, and the other end of the cable assembly is terminated with connector jack 52. A typical length of coaxial three-phase servo motor power cable that is installed aboard a military artillery vehicle is 75 feet. This design has tight capacitive coupling between the motor power conductors and shield, as depicted by the close proximity 49 between power wires 31, 32, 33 and shield braid 35. This close proximity 49 increases electrical capacitance of the coaxial three-phase servo motor power cable, and therefore contributes to the detrimental system effects previously described.

Figure 3:
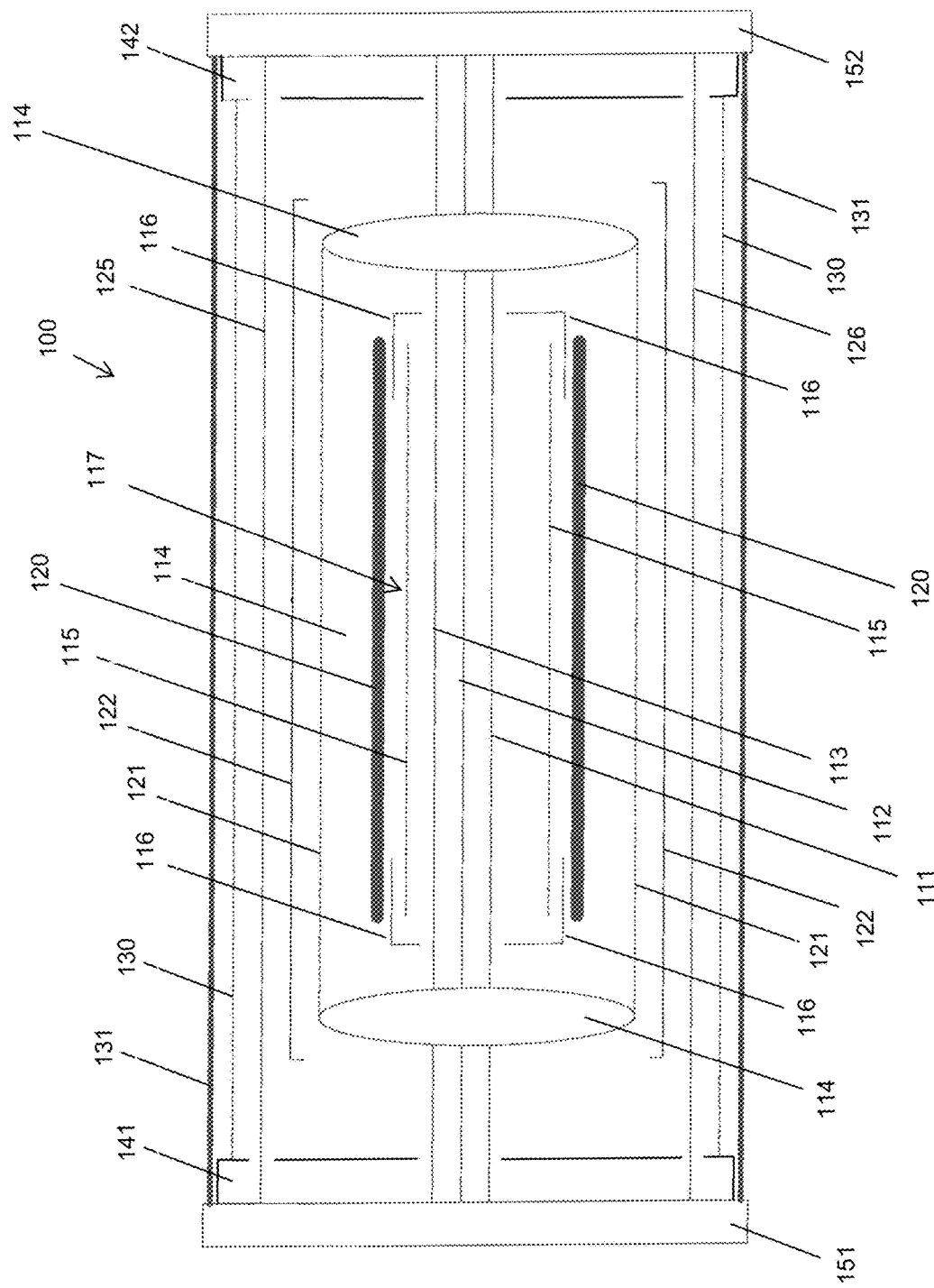
FIG. 3 is a cross-sectional diagram of the coaxial three-phase servo motor power cable according to the present invention.

FIG. 3 is a cross-sectional diagram of the coaxial three-phase servo motor power cable according to the present invention. A typical embodiment of the coaxial three-phase servo motor power cable 100 includes three power conductors, 111, 112, 113, which correspond to electrical phase terminals A, B, and C, respectively. Three power conductors, 111, 112, 113 deliver three phase differential electrical power from servo amplifier unit 10 to servo motor 60. The three power conductors, 111, 112, 113 are twisted together and are covered by braid shield 115 which is not terminated at their ends, but is instead electrically insulated from any other electrically conductive component. Taken together, this assembly becomes the shielded twisted triple cable 117. Braid shield 115 establishes capacitive coupling between each of the three power conductors 111, 112, 113, thereby balancing the capacitive coupling between each power conductor 111, 112, 113 and braid shield 115. This capacitive coupling has the effect of making the power conductors 111, 112, 113 appear as a single electrical conductor for common mode conductor to shield currents. Shrink tubing 116 is used to terminate each end of braid shield 115, electrically insulating it from other electrical components in coaxial three-phase servo motor power cable 100.

Conduit 120 surrounds shielded twisted triple cable 117. Conduit 120 is electrically insulating and mechanically flexible. In an embodiment, conduit 120 is manufactured from polytetrafluoroethylene (PFA, commercially marketed as TEFLON®.) Shielded twisted triple cable 117 is routed inside conduit 120, with the inside diameter of conduit 120 generally being significantly greater than the outside diameter of shielded twisted triple cable 117. Conduit braid shield 121 surrounds conduit 120, with conduit 120 separating the shielded twisted triple cable 117 from conduit braid shield 121. Conduit braid shield 121 is electrically terminated at each end of coaxial three-phase servo motor power cable 100, thereby resulting in an electrical circuit.

In an embodiment, conduit 120 has a relatively thin wall thickness, and the inside diameter of the conduit is between two and three times the outside diameter of the shielded twisted triple cable, thereby creating void space 114 between shielded twisted triple cable 117 and conduit braid shield 121. Void space 114 is filled with air, which becomes the electrical dielectric. In an embodiment, back shells 141, 142 are at each end of coaxial three-phase servo motor power cable 100, and they perform the function of an EMI/environmental connector. Shrink tubing 122 covers conduit braid shield 121. In an embodiment, plug 151 is at one end, and jack 152 is at the other end of coaxial three-phase servo motor power cable 100. Plug 151 and jack 152 will enable the rapid installation of coaxial three-phase servo motor power cable 100 in a servo electronic system during system installation, while also enabling rapid disconnection and reconnection during equipment maintenance or replacement.

In an embodiment, additional conductors 125, 126 are included in coaxial three-phase servo motor power cable 100 to provide signals from servo motor 60 back to the servo amplifier unit 10, with additional conductors 125, 126 being routed on the outside of shrink tubing 122. Over braid shield 130 covers additional conductors 125, 126, and then shrink tubing 131 provides an outer sheath. When multiple braid shields are used in a particular embodiment, such as the use of both conduit braid shield 117 and over braid shield 130 as described in an embodiment above, they are typically electrically insulated from each other along the entire length of coaxial three-phase servo motor power cable 100, and they are electrically terminated to back shells 141, 142 at each end of coaxial three-phase servo motor power cable 100.

The coaxial three-phase servo motor power cable of the present invention contains air void space 114 between the shielded twisted triple cable 117 and conduit braid shield 121, whereby the effective electrical capacitance of this present invention may be modeled using the following equation:

$$C[\text{Farads/meter}] = (2 \times \pi \times \varepsilon o \times \varepsilon r)/Ln(Bc/Ac), \text{ where:}$$

$\varepsilon o$ [Farads/meter]=Permittivity of Free Space=8.854E−12;

$\varepsilon r$=Relative Permittivity=1.0 Air;

Bc [meters]=Distance from the center of conduit 120 to the inner wall of the conduit 120; and Ac [meters]=Radius of shielded twisted triple cable 117. This equation is valid despite the fact that twisted triple cable 117 is free to move within the void space 114 that exists inside conduit 120, and the ratio of Bc/Ac may be adjusted to achieve the required capacitance calculation.

The inductance between the shielded twisted triple cable 117 and conduit braid shield 121 of the present invention may be modeled using the following equation:

$$L[\text{Henries/meter}] = (\mu o \times \mu r \times Ln(BI/AI))/(2 \times \pi) \text{ where:}$$

$\mu o$ [Henries/meter]=Permeability of free space ~$4 \times \pi \times 1$E−7;

$\mu r$=Relative Permeability=1.0 for the air and TEFLON® composite dielectric;

BI [meters]=Distance from the center of conduit 120 to conduit braid shield 121; and AI [meters]=Radius of shielded twisted triple cable 117. This equation is valid despite the fact that the shielded twisted triple cable 117 is free to move within void space 114 that exists inside conduit 120.

In an embodiment of the present invention that was evaluated during the reduction to practice of the invention, a ratio of B/A was targeted in the range of 2.0 to 3.2 which results in an electrical impedance similar to that of coaxial cables of the prior art. For example, RG-58 coaxial cable, which has been widely used in RF design applications, has a characteristic impedance of 50Ω. The characteristic impedance of this particular embodiment of the present invention may be modeled by the following set of equations:

$$c[\text{Farads/meter}] = (2 \times \pi \times \varepsilon o \times \varepsilon r)/Ln(Bc/Ac) = 62.6E-12F/M, \text{ where:}$$

$\varepsilon o$ [Farads/meter]=Permittivity of Free Space=8.854E−12;

$\varepsilon r$=Relative Permittivity=1.0 for the air and polytetrafluoroethylene composite dielectric;

Bc [meters]=Distance from the center of the conduit 120 to the inner wall of the conduit 120=7.658E−3; and Ac [meters]=Radius of the shielded twisted triple cable 117=3.048E−3.

Using this same range, a ratio of B/A in the range of 2.0 to 3.2 was targeted, achieving the following:

$$L[\text{Henries/meter}] = (\mu o \times \mu r \times Ln(BI/AI))/(2 \times \pi) = 228E-9H/m, \text{ where:}$$

$\mu_0$ [Henries/meter]=Permeability of Free Space=$4 \times \pi \times 1E-7$;

$\mu_r$=Relative Permeability=1.0 for the air and polytetrafluoroethylene composite dielectric;

BI [meters]=Distance from the center of conduit 120 to conduit braid shield 121=9.56E−3 m;

AI [meters]=radius of shielded twisted triple cable 117=3.048E−3 m;

Cable characteristic impedance=SQRT (L/C)=60.4Ω.

Initial testing on a prototype embodiment of the present invention using a 75 foot cable assembly demonstrated a 15× reduction in capacitance and a 3.75× reduction in peak noise current. Additionally, testing of this prototype embodiment produced no troublesome interference with the operation of ground fault transducer 15.

Figure 4:
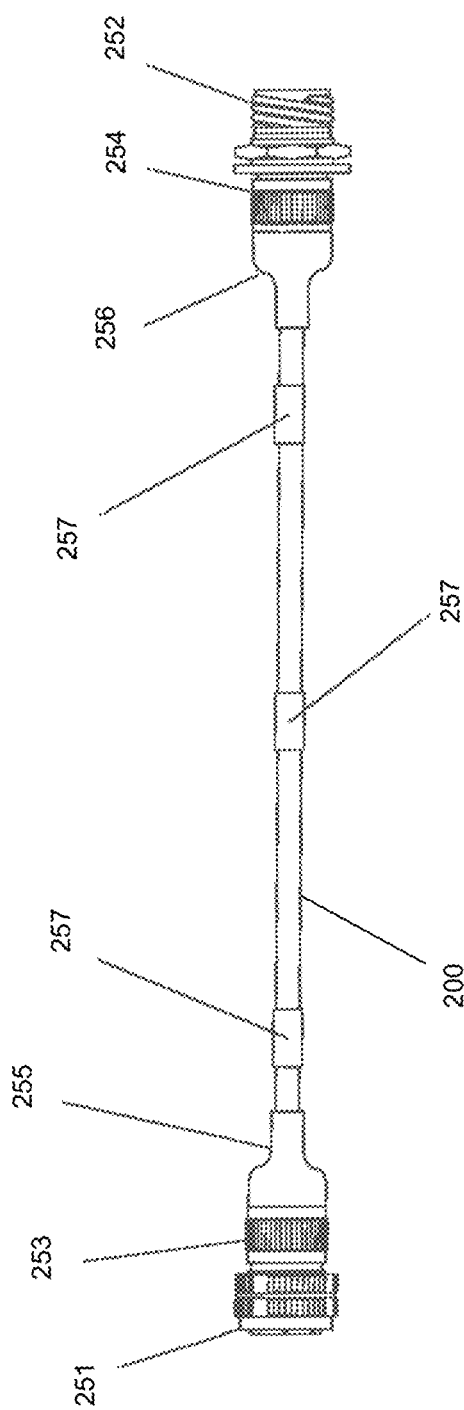
FIG. 4 is a top view of a typical embodiment of a completed cable assembly of the coaxial three-phase servo motor power cable according to the present invention.

FIG. 4 is a top view of a typical embodiment of a completed cable assembly of the coaxial three-phase servo motor power cable according to the present invention, and it depicts a typical embodiment that would be provided for a military field vehicle installation. Cable piece 200 is manufactured from coaxial three-phase servo motor power cable 100 as depicted in FIG. 3. In an embodiment, cable piece 200 may be 75 feet in length. It should be obvious to those who are skilled in the art that any practical cable length utilizing the disclosure of the present invention will yield benefits over an equivalent cable length of the prior art, and the present invention covers embodiments of any cable length. However, a length of 75 feet was selected to illustrate this embodiment because that is the typical length of coaxial three-phase servo motor power cable that is installed aboard a military artillery vehicle of the prior art.

In this embodiment, plug 251 terminates one end of cable piece 200. Plug 251 may be a commercially available electrical plug that is compatible for installation with servo amplifier unit 10, or it may be a new design that does not currently exist. Back shell 253 joins cable piece 200 to plug 251, with conduit braid shield 121 and over braid shield 130 of the coaxial three-phase servo motor power cable 100 being electrically terminated at back shell 253. Hot melt heat shrink 255 covers the region where cable piece 200 meets back shell 253, providing mechanical support while sealing against environmental contamination and moisture. Similarly, jack 252 terminates the other end of cable piece 200, and jack 252 may be a commercially available electrical jack that is compatible for installation with servo motor 60, or it may be a new design that does not currently exist. Back shell 254 joins cable piece 200 to jack 252, with the over braid shield 130 of the coaxial three-phase servo motor power cable 100 being electrically terminated at back shell 254. Hot melt heat shrink 256 covers the region where cable piece 200 meets back shell 254, providing mechanical support while sealing against environmental contamination and moisture.

In an embodiment, one or more labels 257 are optional, but if used, they may be on the outside of cable piece 200 near plug 251, near jack 252, and if also desired, at one or more points along the length of cable piece 200 to provide suitable information to a user.

Figure 5:
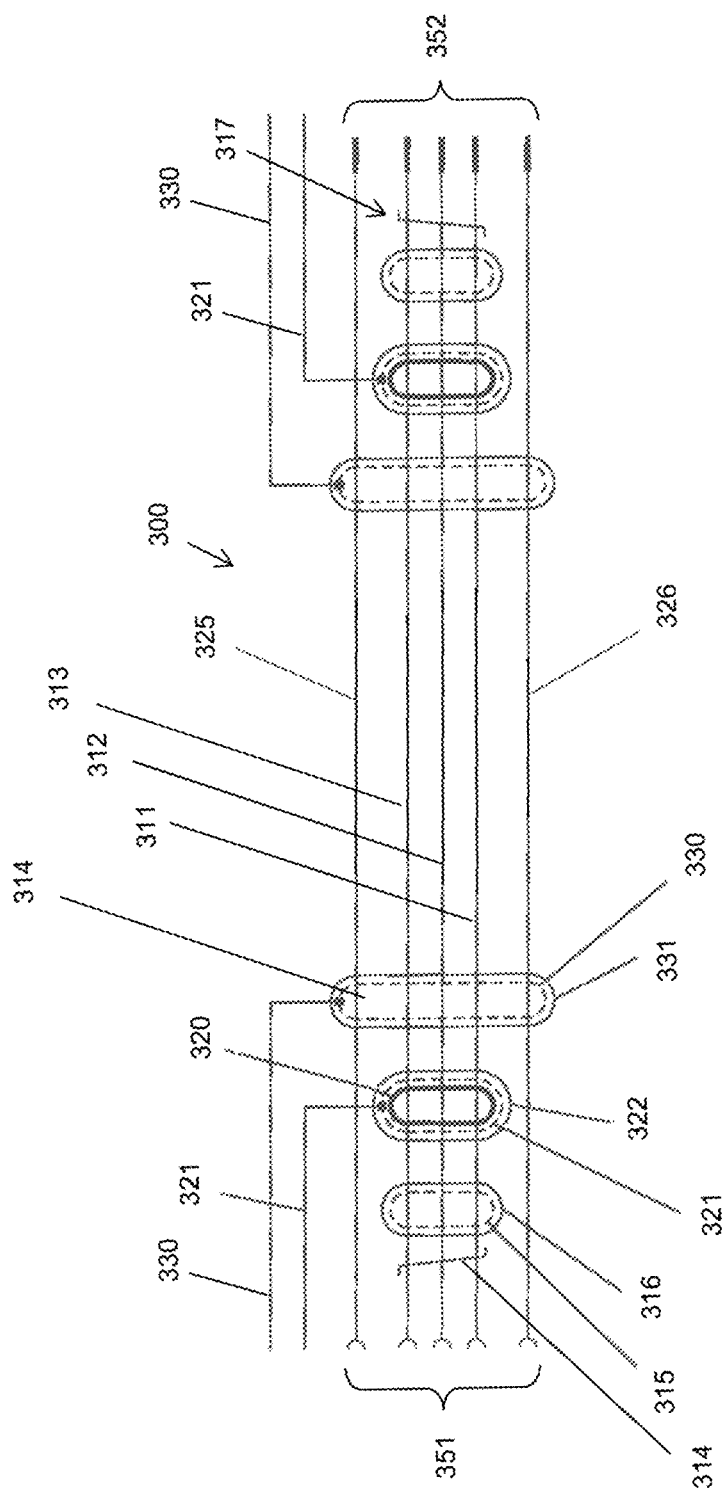
FIG. 5 is an electrical schematic diagram of a typical embodiment of a completed cable assembly of the coaxial three-phase servo motor power cable according to the present invention.

FIG. 5 is an electrical schematic diagram of a typical embodiment of a completed cable assembly of the coaxial three-phase servo motor power cable according to the present invention. Power wires 311, 312, 313 correspond to servo motor phases A, B, and C, respectively. In an embodiment, additional conductors 325, 326 are included in the coaxial three-phase servo motor power cable 300 to provide signals from servo motor 60 back to servo amplifier unit 10. Twist symbol 314 depicts the twisting together of power wires 311, 312, 313, along with braid shield 315 forming shielded twisted triple cable 317. Heat shrink 316 covers shielded twisted triple cable 317. Shielded twisted triple cable 317 is routed through conduit 320, which is flexible, with the large void space between shielded twisted triple cable 317 and conduit 320 being filled by air. The electrical schematic diagram depicted in FIG. 5 illustrates both ends of a completed cable assembly. For visual clarity, many of the components described here are only labeled on one end of the schematic. It would be obvious to one who is skilled in the art that the same labels would be applied to the components on both ends of the diagram.

Shielded twisted triple cable 317 is allowed to mechanically float within the void space 114 inside of conduit 320. The outside of conduit 320 is covered by conduit braid shield 321, which is in turn covered by shrink tubing 322. In an embodiment, additional conductors 325, 326 are included in the coaxial three-phase servo motor power cable 300 to provide signals from servo motor 60 back to servo amplifier unit 10, and they are routed on the outside of shrink tubing 322. Over braid shield 330 covers additional conductors 325, 326, and then shrink tubing 331 provides an outer sheath. In the embodiment depicted, plug 351 is located at one end of the coaxial three-phase servo motor power cable 300 and it contains five connectors. In this embodiment, jack 352 is located at the other end of the coaxial three-phase servo motor power cable 300 and it contains five connectors.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A coaxial cable for electrical power transmission, comprising:
   a shielded twisted power cable, the shielded twisted power cable being comprised of a plurality of power conductors that are twisted together and being covered by a braid shield, the braid shield being electrically insulated from any other electrical component;
   an electrically insulating shrink tubing covering the shielded twisted power cable;
   an electrically nonconductive conduit surrounding the electrically insulating shrink tubing, wherein the inside diameter of the electrically nonconductive conduit is greater than the outside diameter of the electrically insulating shrink tubing, said electrically nonconductive conduit terminates without contacting a back shell;
   the electrically nonconductive conduit having an inside diameter two or three times the outer diameter of the shielded twisted power cable defining a void space surrounding the electrically insulating shrink tubing inside of the electrically nonconductive conduit;
   a conduit braid shield covering the electrically nonconductive conduit, wherein the conduit braid shield is terminated at each end without contacting the back shell,
   a shrink tubing layer covers the conduit braid shield, said shrink tubing layer terminating prior to the back shell and sealed, the void space filled with air to form a dielectric layer; and
   wherein the conduit braid shield mechanically floats inside the void space defined by the electrically nonconductive conduit.

2. The coaxial cable of claim 1, wherein the shielded twisted power cable is comprised of three power conductors.

3. The coaxial cable of claim 1, wherein the shielded twisted power cable is comprised of two power conductors.

4. The coaxial cable of claim 1, wherein the shielded twisted power cable is comprised of four or more power conductors.

5. The coaxial cable of claim 1, wherein the inside diameter of the electrically nonconductive conduit is at least 1.5 times the outside diameter of the electrically insulating shrink tubing covering the shielded twisted triple cable.

6. The coaxial cable of claim 1, wherein the electrically nonconductive conduit is mechanically flexible.

7. The coaxial cable of claim 1, wherein the electrically nonconductive conduit is manufactured from polytetrafluoroethylene.

8. The coaxial cable of claim 1, wherein at least one additional electrical wire runs the length of the coaxial power cable, and wherein the at least one additional electrical wire is on the outside of the conduit braid shield covering the electrically nonconductive conduit.

9. The coaxial cable of claim 8, wherein an over braid shield covers the at least one additional electrical wire, and wherein the over braid shield is electrically terminated at each end.

10. The coaxial cable of claim 9, wherein an outer sheath covers the over braid shield.

11. The coaxial cable of claim 1, wherein the void space is filled with air.

12. The coaxial cable of claim 1, wherein the void space is filled with a gas other than air.

13. The coaxial cable of claim 1, having two ends, wherein electrical mechanical connectors are affixed to the coaxial cable at its two ends, the electrical mechanical connectors being electrically connected to the power conductors at their two ends, and wherein a back shell on each electrical mechanical connector electrically terminates the braid shield at its two ends.

14. A coaxial cable for electrical power transmission, comprising:
   a shielded twisted power cable, the shielded twisted power cable being comprised of a plurality of power conductors that are twisted together and being covered by a braid shield covering the power conductors, the braid shield being electrically insulated from any other electrical component;
   an electrically insulating shrink tubing covering the shielded twisted power cable;
   an electrically nonconductive conduit surrounding the electrically insulating shrink tubing,
   wherein the inside diameter of the electrically nonconductive conduit is greater than the outside diameter of the electrically insulating shrink tubing;
   the electrically nonconductive conduit defining a void space surrounding the electrically insulating shrink tubing inside of the electrically nonconductive conduit;
   wherein the electrically nonconductive conduit terminates at each end without contacting a backshell;
   wherein the braid shield mechanically floats inside the void space defined by the electrically nonconductive conduit; and
   wherein at least one additional electrical wire runs the length of the coaxial power cable, and wherein the at least one additional electrical wire is on the outside of a conduit braid shield covering the electrically nonconductive conduit.

15. A method of making a coaxial cable for electrical power transmission, comprising:
   inserting a shielded twisted power cable into an electrically nonconductive conduit, wherein the inside diameter of the electrically nonconductive conduit is two to three times greater than the outside diameter of the shielded twisted power cable, said shielded twisted power cable comprising a plurality of power conductors that are twisted together and being covered by a braid shield covering the power conductors, the braid shield terminated without contacting back shell, and wherein the electrically nonconductive conduit defines a void space between the shielded twisted power cable and the electrically nonconductive conduit;
   floating the braid shield mechanically inside the void space defined by the electrically nonconductive conduit;
   placing a conduit braid shield over the outside of the electrically nonconductive conduit;
   covering the conduit braid shield with a layer of shrink wrap to seal the void space, said layer of shrink wrap terminating without contacting the back shell;
   attaching an electrical mechanical connector at each end of the coaxial cable, wherein each electrical mechanical connector has the back shell; wherein the nonconductive conduit terminates without contacting the back shell,
   attaching each electrical mechanical connector to each end of the shielded twisted power cable; and
   attaching each back shell to an over braid shield.

16. The method of claim 15, wherein at least one additional electrical wire is placed along the length of the coaxial power cable, and wherein the at least one additional electrical wire is on the outside of the conduit braid shield covering the electrically nonconductive conduit.

17. The method of claim 15, wherein the void space is filled with air.

18. The method of claim 15, wherein the void space is filled with a gas other than air.

* * * * *